May 29, 1956  H. S. RAINBOW  2,747,365
SUPPLY OF HOT AIR FROM A GAS TURBINE ENGINE FOR
ANTI-ICING OR OTHER PURPOSES
Filed June 29, 1954  2 Sheets-Sheet 1

United States Patent Office 2,747,365
Patented May 29, 1956

2,747,365

SUPPLY OF HOT AIR FROM A GAS TURBINE ENGINE FOR ANTI-ICING OR OTHER PURPOSES

Horace S. Rainbow, Coventry, England, assignor to Armstrong Siddeley Motors Limited, Coventry, England Application June 29, 1954, Serial No. 440,193

Claims priority, application Great Britain July 3, 1953

8 Claims. (Cl. 60—39.09)

The invention relates to a gas turbine engine, having an axial-flow compressor, of the kind in which the so-called intermediate structural section of the engine comprises inner and outer frusto-conical casings which are interconnected by aerofoil-section spokes to form the outlet diffuser of the compressor connected to the combustion chamber system, there being a surrounding channel-section member, at the outer ends of the spokes, constituting part of a hollow, closed-section casing from which engine mounting means are carried.

The main object of the invention is to adapt such a structural section to provide a supply of hot air for anti-icing or other purposes, and effectively to control its distribution.

According to the invention, hot air is fed from the diffuser casing into the surrounding hollow, closed-section casing, and the latter supports a manifold the interior of which is connected with the interior of the said hollow casing through at least one controllable valve, the manifold having at least one outlet point.

Figure 1:
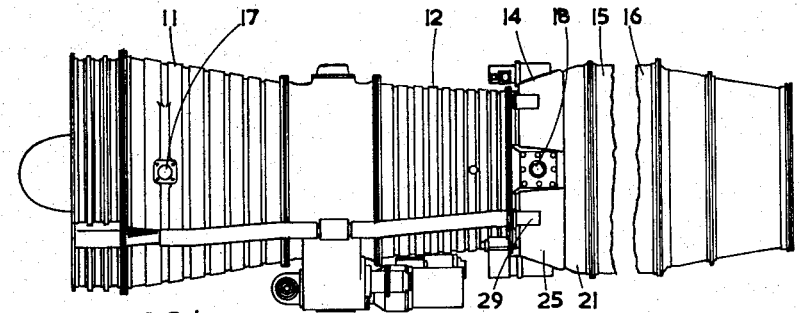
Figure 1 is an elevation of a gas turbine engine, having an axial-flow compressor, in which the so-called intermediate structural section is arranged according to the invention.
Figure 2:
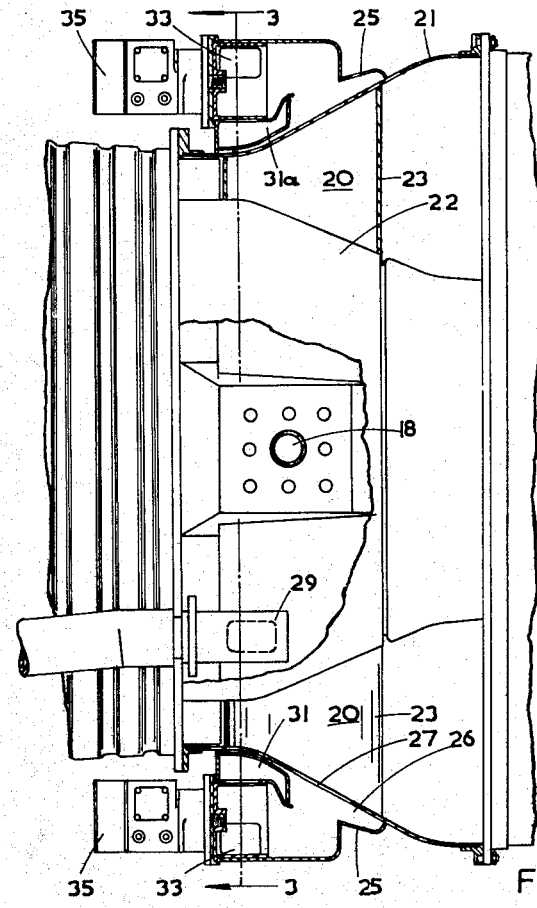
Figure 2 is an enlarged elevation of the intermediate structural section, the view showing in section, taken on the broken line 2—2 of Figure 3, the outlet end of the compressor and the inlet end of the combustion chamber system of Figure 1.
Figure 3:
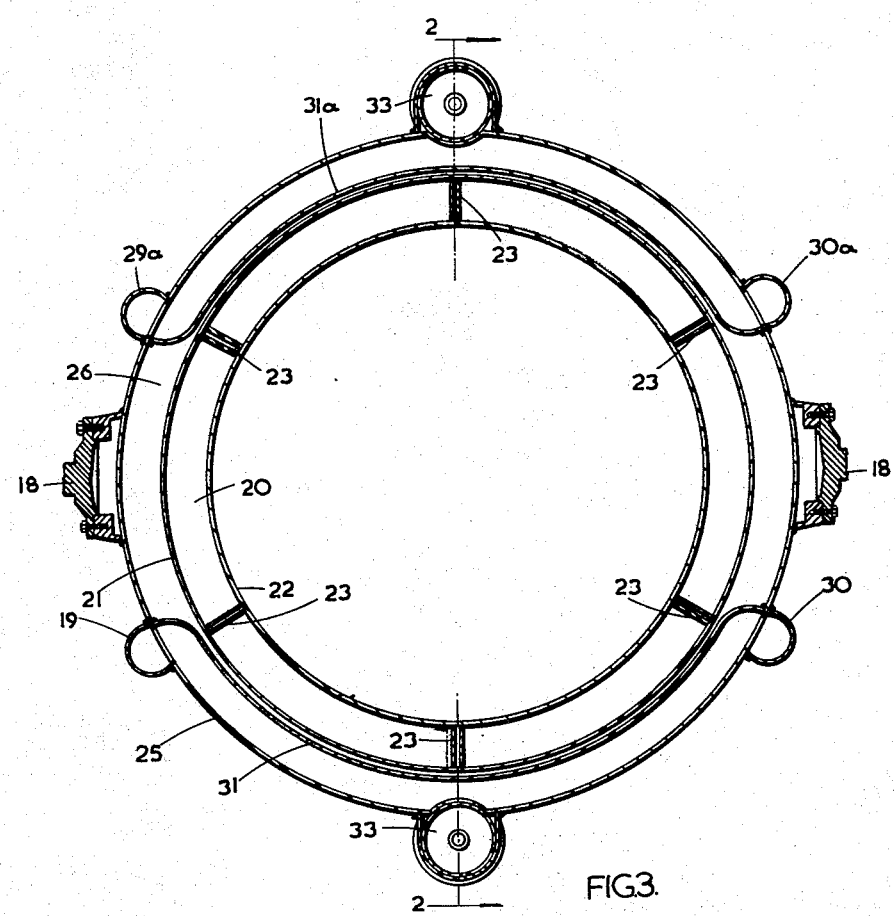
Figure 3 is a cross-section taken mainly on the line 3—3 of Figure 2, with parts of the rear engine mounting means broken away.

The construction shown by Figure 1 is of a compound gas turbine engine having a low-pressure compressor section within the casing 11, a high-pressure compressor section within the casing 12, and the intermediate structural section, designated generally by the reference numeral 14, connected to the outlet end of the high-pressure compressor section. 15 indicates the casing of a combustion chamber system, and 16 the casing of a compound turbine the respective sections of which may be connected in a usual manner with the high and low pressure compressor sections. A pair of trunnions 17 form a forward mounting point, and another pair 18 a rearward mounting point.

In the construction of compound gas turbine engine shown, the temperature of the air in the outlet diffuser 20 of the compressor (i. e., of the high-pressure section of the compressor) will be sufficiently high, for example, over 350° C., to serve by itself for anti-icing purposes if properly applied therefor, and it will not be necessary to add further heat to this hot air. Obviously, however, heat can be added when desirable.

The outlet diffuser itself comprises an outer steel casing 21 connected with an inner casing 22, which may be machined from an iron casting, by aerofoil-section spokes 23. The surrounding channel-section member 25 is of steel and welded to the outer surface of the outer casing 21, and the interior 26 of the hollow casing formed by the channel-section member and the outer casing is connected with the interior of the diffuser 20 as by a number of bleed holes or slits 27 in the outer casing which are sufficient in quantity to extract the requisite amount of hot air.

For anti-icing purposes it is preferable to use, say, two outlet conduits 29, 30 connected to the ends of a manifold 31 of part-circular shape and any desired cross-section disposed within the hollow casing 21, 25. The manifold is partly formed, as shown, by the channel-section member 25 and extends from near one of the rear engine mounting means to near the other, the manifold having between its ends a controlling valve 33. This controlling valve has means (not shown) adapted to "sense" the temperature and the atmospheric water content and in the necessary conditions automatically to open the valve to a sufficient extent to allow a requisite quantity of hot air to pass into the manifold 31 and thence to the outlet conduits 29, 30. The valve may be a cylindrical ported one, operated by an electric actuator 35.

A second part-circular manifold 31a may be similarly arranged, on the other sides of the two rear engine mounting means 18 (i. e., to be arcuate about the axis of the engine and thus coaxial with the first manifold 31), to supply outlet conduits 29a, 30a at its ends with hot air for other purposes—in which case the valve 33 for this second manifold may be manually controlled.

Thus, by means of the present invention, the intermediate structural member 14 of a gas turbine engine, particularly of a compound engine or one which is arranged to operate at a substantially similar high compression ratio, can be adapted in a very simple manner for supplying hot air for anti-icing and other purposes.

What I claim as my invention and desire to secure by Letters Patent of the United States is:

1. A gas turbine engine having an axial-flow compressor, a combustion chamber system, an intermediate structural section forming an outlet diffuser of the compressor and connected to the combustion chamber system, the intermediate structural section consisting of inner and outer frusto-conical casings which are interconnected by aerofoil-section spokes, a channel-section member at the outer ends of said spokes constituting part of a hollow closed-section casing, means interconnecting the interiors of said outlet diffuser and said closed-section casing to supply hot air from the former to the latter, a manifold having at least one outlet point and having its interior connected with the interior of said closed-section casing, and at least one controllable valve in the connection between the interiors of the manifold and said closed-section casing.

2. In a gas turbine engine, an axial-flow compressor, a combustion chamber system, an intermediate structural section forming an outlet diffuser of the compressor and connected to the combustion chamber system, the intermediate structural section consisting of inner and outer frusto-conical casings interconnected by aerofoil-section spokes, a channel-section member around and welded to the outer surface of said outer casing to form a hollow closed-section casing, said outer casing having a number of holes in it to pass hot air from the outlet diffuser into said closed-section casing, a manifold having at least one outlet point and having its interior connected with the interior of said closed-section casing, and at least one controllable valve through which the connection between the interiors of the manifold and of said closed-section casing is made.

3. A gas turbine engine, according to claim 1, and in which engine mounting means are carried by said channel-section member at angularly spaced apart points, and the manifold is of arcuate shape with an outlet point at each end, the manifold having between its ends the controllable valve and extending from near one of the engine mounting means to near the other.

4. A gas turbine engine, according to claim 3, and in which a second arcuate shaped manifold is similarly arranged, on the other sides of the two engine mounting means to be arcuate about the axis of the engine and thus coaxial with the first manifold, to provide outlet points at its ends for hot hair for other purposes.

5. A gas turbine engine having an axial-flow compressor, a combustion chamber system, an intermediate structural section forming an outlet diffuser of the compressor and connected to the combustion chamber system, the intermediate structural section consisting of inner and outer frusto-conical casings which are interconnected by aerofoil-section spokes, a channel-section member at the outer ends of said spokes constituting part of a hollow-closed section casing, means interconnecting the interiors of said outlet diffuser and said closed-section casing to supply hot air from the former to the latter, a manifold having at least one outlet point and having its interior connected with the interior of said closed-section casing, the manifold lying within and being partly formed by the channel-section member, and at least one controllable valve in the connection between the interiors of the manifold and said closed-section casing.

6. In a gas turbine engine, an axial-flow compressor, a combustion chamber system, an intermediate structural section forming an outlet diffuser of the compressor and connected to the combustion chamber system, the intermediate structural section consisting of inner and outer frusto-conical casings interconnected by aerofoil-section spokes, a channel-section member around and welded to the outer surface of said outer casing to form a hollow closed-section casing, said outer casing having a number of holes in it to pass hot air into said closed-section casing, a manifold having at least one outlet point and having its interior connected with the interior of said closed-section casing, the manifold lying within and being partly formed by the surrounding channel-section member, and at least one controllable valve through which the connection between the interiors of the manifold and of said closed-section casing is made.

7. A gas turbine engine, according to claim 5, and in which engine mounting means are carried by said channel-section member at angularly spaced apart points, and the manifold is of arcuate shape with an outlet at each end, the manifold having between its ends the controllable valve and extending from near one of the engine mounting means to near the other.

8. A gas turbine engine, according to claim 7, and in which a second arcuate shaped manifold is similarly arranged, on the other sides of the two engine mounting means to be arcuate about the axis of the engine and thus coaxial with the first manifold, to provide outlet points at its ends for hot air for other purposes.

References Cited in the file of this patent

UNITED STATES PATENTS

| 2,443,054 | Putz et al. | June 8, 1948 |
| 2,632,997 | Howard et al. | Mar. 31, 1953 |

FOREIGN PATENTS

| 618,525 | Great Britain | Feb. 23, 1949 |
| 619,390 | Great Britain | Mar. 8, 1949 |